(12) United States Patent
Korwin-Gajkowski et al.

(10) Patent No.: US 12,425,378 B2
(45) Date of Patent: Sep. 23, 2025

(54) PRIVACY PRESERVING VERIFICATION OF USER DATA

(71) Applicant: Sony Group Corporation, Tokyo (JP)

(72) Inventors: Tomasz Korwin-Gajkowski, Stuttgart (DE); Rik Claesen, Stuttgart (DE); Hugo Embrechts, Stuttgart (DE); Teemu Pohjola, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 253 days.

(21) Appl. No.: 17/801,524

(22) PCT Filed: Mar. 4, 2021

(86) PCT No.: PCT/EP2021/055461
§ 371 (c)(1),
(2) Date: Aug. 23, 2022

(87) PCT Pub. No.: WO2021/185589
PCT Pub. Date: Sep. 23, 2021

(65) Prior Publication Data
US 2023/0070824 A1  Mar. 9, 2023

(30) Foreign Application Priority Data

Mar. 17, 2020 (EP) .................................... 20163482

(51) Int. Cl.
*H04L 9/40* (2022.01)
*H04L 9/32* (2006.01)

(52) U.S. Cl.
CPC ........ *H04L 63/0428* (2013.01); *H04L 9/3247* (2013.01)

(58) Field of Classification Search
CPC ..... H04L 9/3247; H04L 9/0643; H04L 9/008; H04L 63/0428
See application file for complete search history.

(56) References Cited

U.S. PATENT DOCUMENTS

| | | | |
|---|---|---|---|
| 7,000,114 B1 * | 2/2006 | Hasebe | H04L 9/3247 713/180 |
| 10,176,529 B2 | 1/2019 | Amigo et al. | |

(Continued)

FOREIGN PATENT DOCUMENTS

| | | |
|---|---|---|
| CN | 109584978 A | 4/2019 |
| CN | 109614820 A | 4/2019 |

(Continued)

OTHER PUBLICATIONS

S. Liu, Q. Qu, L. Chen and L. M. Ni, "SMC: A Practical Schema for Privacy-Preserved Data Sharing over Distributed Data Streams," in IEEE Transactions on Big Data, vol. 1, No. 2, pp. 68-81, Jun. 1, 2015. (Year: 2015).*

(Continued)

*Primary Examiner* — Kari L Schmidt
(74) *Attorney, Agent, or Firm* — XSENSUS LLP

(57) ABSTRACT

Embodiments of the present disclosure relate to a method. The method comprises, at a first user device, receiving user data from a tamper-proof second user device. Further, the method comprises, at the first user device, aggregating the user data according to a first logic and transmitting the aggregated user data and the user data to an external server. The method further comprises, at the external server, verifying whether the first logic, by which the aggregated user data and the user data are related to each other, corresponds to a predefined second logic for verifying a validity of the aggregated user data.

12 Claims, 6 Drawing Sheets

(56) References Cited

U.S. PATENT DOCUMENTS

| | | | |
|---|---|---|---|
| 10,452,865 B2* | 10/2019 | Wang | G06F 21/6254 |
| 10,621,885 B2* | 4/2020 | Knickerbocker | A61B 5/0022 |
| 2006/0101285 A1* | 5/2006 | Chen | H04L 63/08 |
| | | | 713/193 |
| 2008/0147502 A1 | 6/2008 | Baker | |
| 2014/0207592 A1* | 7/2014 | Kavis | G06Q 40/12 |
| | | | 705/21 |
| 2014/0341441 A1* | 11/2014 | Slaby | G06V 40/193 |
| | | | 382/117 |
| 2015/0127298 A1* | 5/2015 | Gangumalla | A61B 5/1123 |
| | | | 702/160 |
| 2015/0332283 A1 | 11/2015 | Witchey | |
| 2016/0094525 A1* | 3/2016 | Lin | G06Q 20/3823 |
| | | | 713/171 |
| 2016/0104041 A1* | 4/2016 | Bowers | G07D 7/12 |
| | | | 382/115 |
| 2016/0105402 A1 | 4/2016 | Soon-Shiong et al. | |
| 2016/0142380 A1 | 5/2016 | Fuller et al. | |
| 2017/0230179 A1* | 8/2017 | Mannan | H04L 9/3226 |
| 2018/0019983 A1 | 1/2018 | Tissot | |
| 2018/0082041 A1 | 3/2018 | Bryant, II | |
| 2018/0181878 A1* | 6/2018 | Kasiviswanathan | G06F 21/6245 |
| 2019/0082968 A1* | 3/2019 | Karnik | A61B 5/01 |
| 2019/0189254 A1* | 6/2019 | Roennow | H04L 9/0637 |
| 2019/0209022 A1* | 7/2019 | Sobol | A61B 5/02055 |
| 2019/0278939 A1* | 9/2019 | Fan | H04L 9/3297 |
| 2020/0045042 A1* | 2/2020 | Peng | A63B 24/0059 |
| 2020/0051561 A1* | 2/2020 | Lai | G06F 3/0346 |
| 2020/0226284 A1* | 7/2020 | Yin | G06F 21/6254 |
| 2020/0401727 A1* | 12/2020 | Hennessy | H04L 9/50 |
| 2021/0121065 A1* | 4/2021 | Jornet | A61B 5/0004 |
| 2021/0250166 A1* | 8/2021 | Sundaresan | H04L 9/0825 |
| 2021/0319894 A1* | 10/2021 | Sobol | G16H 20/30 |
| 2021/0328766 A1* | 10/2021 | No | H04L 9/3093 |
| 2021/0350021 A1* | 11/2021 | Wang | H04L 9/3247 |
| 2021/0352050 A1* | 11/2021 | Kurylko | H04L 63/0428 |
| 2022/0094519 A1* | 3/2022 | Jeljeli | H04L 9/088 |
| 2022/0376928 A1* | 11/2022 | Wang | H04L 9/14 |
| 2025/0094632 A1* | 3/2025 | Nozawa | G06F 21/62 |

FOREIGN PATENT DOCUMENTS

| | | |
|---|---|---|
| CN | 110505185 A | 11/2019 |
| JP | 2015118185 A | 6/2015 |
| WO | 2019/032643 A1 | 2/2019 |

OTHER PUBLICATIONS

Ding, Yepeng, and Hiroyuki Sato. "Derepo: A distributed privacy-preserving data repository with decentralized access control for smart health." 2020 7th IEEE International Conference on Cyber Security and Cloud Computing (CSCloud)/2020 6th IEEE International Conference(EdgeCom), 2020, pp. 29-35. (Year: 2020).*

Silva, Leandro Ventura, et al. "Security and privacy preserving data aggregation in cloud computing." Proceedings of the Symposium on Applied Computing. 2017, pp. 1732-1738. (Year: 2017).*

H. Jin, Y. Luo, P. Li and J. Mathew, "A Review of Secure and Privacy-Preserving Medical Data Sharing," in IEEE Access, vol. 7, pp. 61656-61669, 2019. (Year: 2019).*

International Search Report and Written Opinion mailed on Apr. 26, 2021, received for PCT Application PCT/EP2021/055461, filed on Mar. 4, 2021, 9 pages.

Zhou et al., "Security and Privacy in Cloud-Assisted Wireless Wearable Communications: Challenges, Colutions, and Future Directions", IEEE Wireless Communications, Apr. 2015, pp. 136-144.

Dwivedi et al., "A Decentralized Privacy-Preserving Healthcare Blockchain for IoT", Sensors, MDPI, vol. 19, No. 326, Available Online At: https://www.mdpi.com/1424-8220/19/2/326/pdf, Jan. 15, 2019, pp. 1-17.

Naganuma, "The newest trend of block chain technology", Information Processing Society of Japan, Jan. 2020, pp. 152-158, vol. 1, No. 2.

* cited by examiner

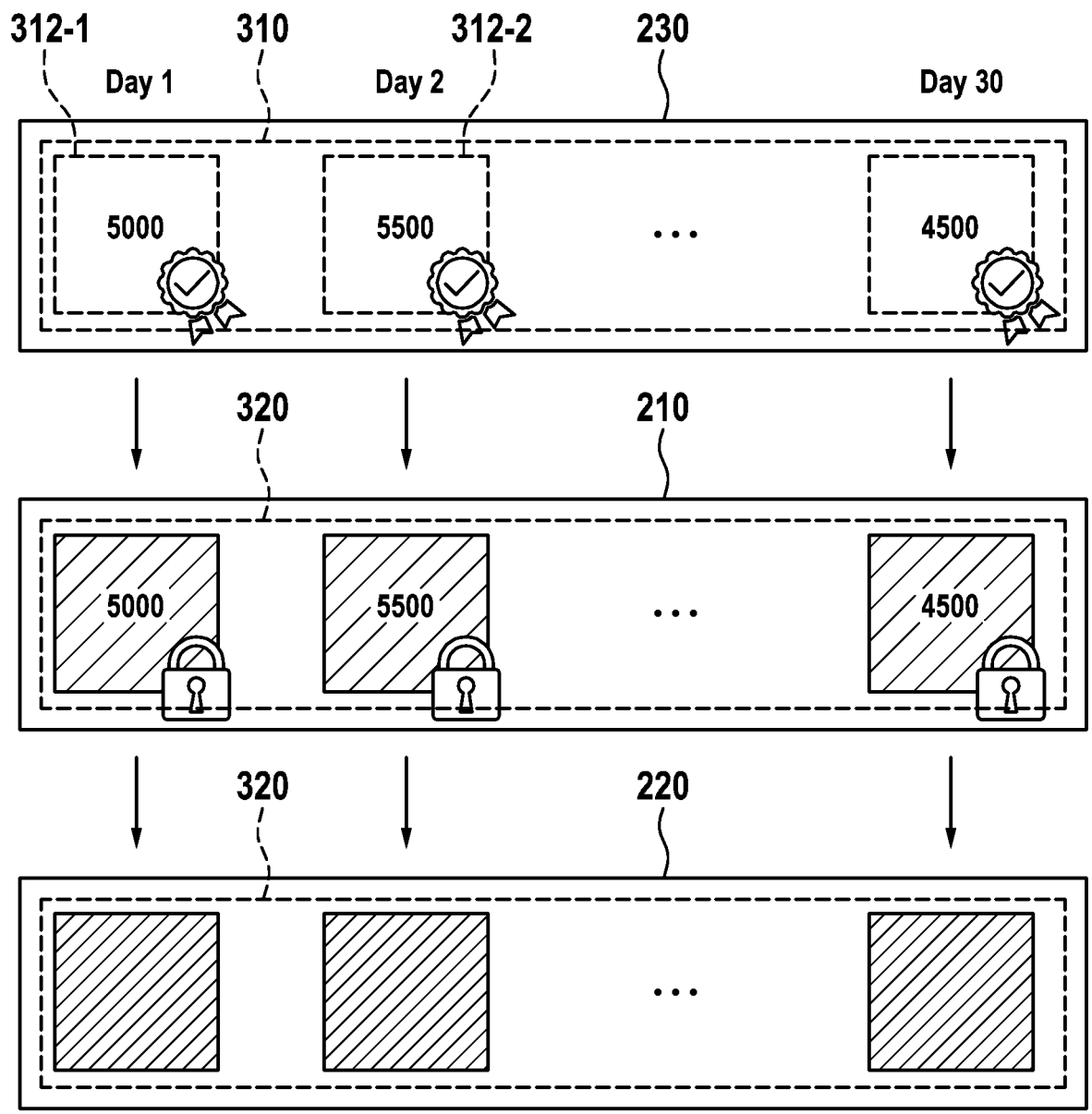

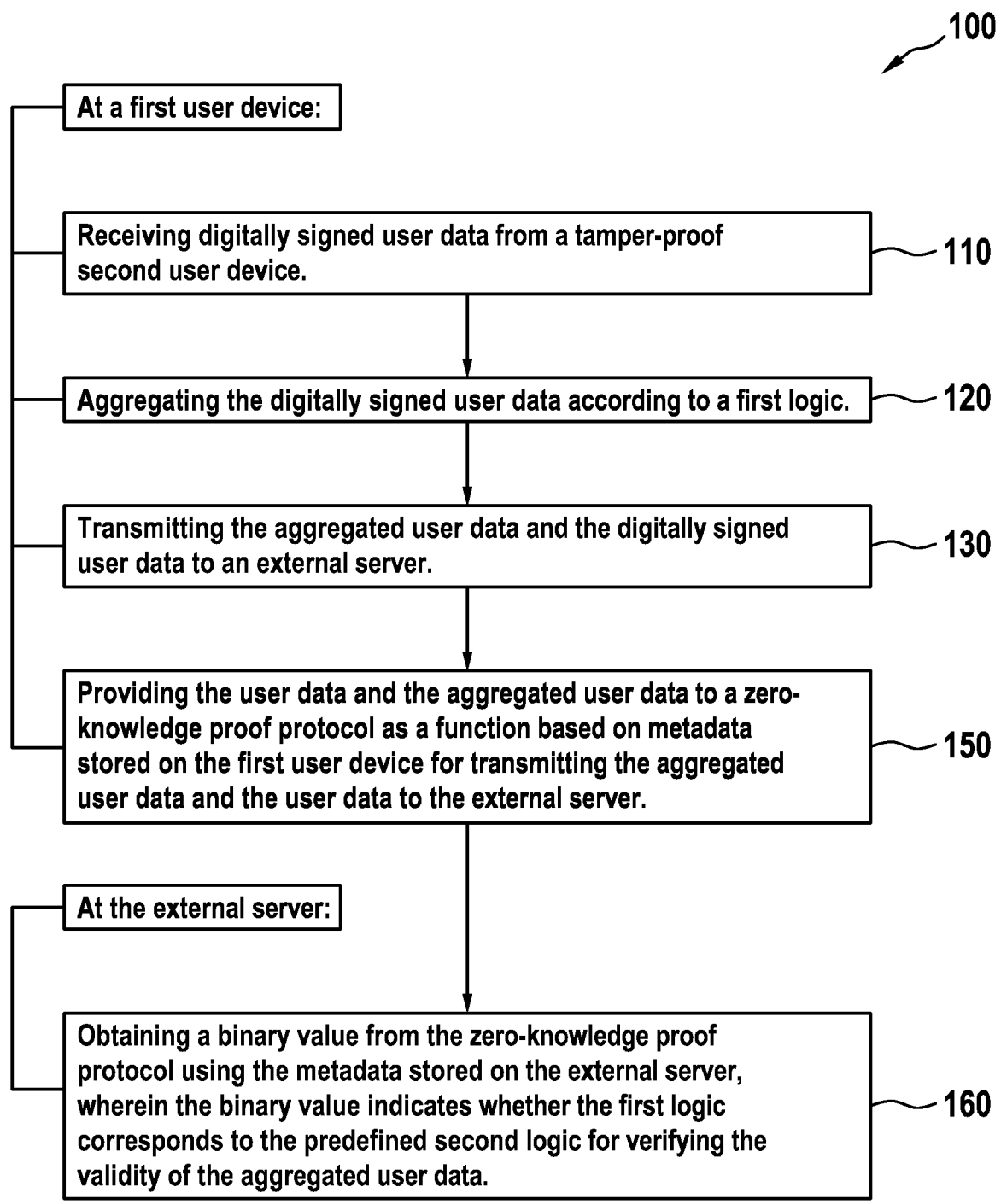

PRIVACY PRESERVING VERIFICATION OF USER DATA

CROSS-REFERENCE TO RELATED APPLICATIONS

The present application is based on PCT filing PCT/EP2021/055461, filed Mar. 4, 2021, which claims priority to EP 20163482.1, filed Mar. 17, 2020, the entire contents of each are incorporated herein by reference.

Field

Embodiments of the present disclosure relate to a method, a first user device, a second user device and a data processing system for a privacy preserving verification of user data.

BACKGROUND

Customers or users can interact with external entities via a smart contract specifying various conditions, services and/or interactions between participating entities (e.g. the user and the external entity).

Some smart contracts may rely on user data. Such smart contracts may further provide for a verification of a validity of the user data to make sure that the user data has not been tampered by the user. In order to verify a validity of the user data, the user may need to reveal user data to the external entity. Since the user data may contain sensitive personal information, a privacy of the user can be violated by revealing the user data to the external entity.

Further, the external entity may have concerns that the user data has been tampered.

A first document (US 2008/0147502 A1) proposes a concept for receiving or sending a verification that a user performed a physical exercise prescribed by an incenting arrangement.

However, the first document does not disclose an appropriate concept for preserving a privacy of the user. This concept may require a verification based on plaintext user data indicative of the physical exercise.

A second document (WO 2019/032643 A1) discloses a concept for processing performance-based healthcare payments. The concept provides for receiving, by a processor, patient health data from a computing device, determining by the processor, that the patient health data fulfills a condition of terms of a contract, and automatically executing, by the processor, the contract in response to determining that the patient health data fulfills the conditions. This may require to evaluate the patient health data in a deciphered form. Thus, the second document may not provide a concept for preserving the privacy of the patient/user.

A third document (US 2016/0142380 A1) proposes a concept for providing user privacy and security using dynamically generated tokens to make a user's identity and actions anony-mous during the user's activities, exchanges or communications on a computer network.

Nonetheless, the concept proposed by the third document does not deliver a solution to overcome concerns of an external entity regarding to tampered user data.

A fourth document (U.S. Pat. No. 10,176,529 B2) discloses an activity evaluation system. The evaluation system comprises an electronic evaluation module configured to determine an activity safety level of a worker from activity data of the worker. Further, the activity evaluation system comprises a communications module to provide the activity data and/or the activity safety level to a computer system operated by a second entity for adjusting risk-related parameters.

The fourth document may not provide a concept for preserving the privacy of a user.

A fifth document (US 2018/0082041 A1) proposes a concept for tracking and reporting fitness data of a cardholder associated with a payment card. The fitness payment card has a fitness tracking component and an ability to report the fitness data to a payment network.

The concept proposed by the fifth document may not be suitable to preserve a privacy of a user/cardholder.

Thus, there may be a demand of a concept providing a privacy preserving verification of user data.

SUMMARY

This demand may be met by the subject matter in accordance with the independent claims. Advantageous embodiments are addressed by the dependent claims.

According to a first aspect, the present disclosure relates to a method. The method comprises, at a first user device, receiving user data from a tamper-proof second user device. Further, the method comprises, at the first user device, aggregating the user data according to a first logic and transmitting the aggregated user data and the user data to an external server. The method further comprises, at the external server, verifying whether the first logic, by which the aggregated user data and the user data are related to each other, corresponds to a predefined second logic for verifying a validity of the aggregated user data.

The first user device, for example, is a personal computer (PC) or a mobile phone. Optional-ly, the first user device can be any other programmable hardware. The first user device can be coupled with the second user device via a data link, such as a Bluetooth, a Near-Field Communication (NFC) interface or a network path, to obtain the user data.

The user data, for example, may comprise one or more records like activity data (e.g. trav-elled distance and/or number of steps), health data (e.g. heart rate and/or blood pressure) or personal information (e.g. age). Further, the user data may comprise a single or multiple records, for example, each indicative of a daily step count of consecutive days.

The second user device, for example, is an activity tracker or a mobile device comprising a heart rate sensor, blood pressure sensor, a Global Positioning System (GPS) sensor, a step counter and/or a data processing circuitry to obtain the user data by monitoring the user.

The user data, for example, can be signed using a private key of the second user device. Thus, the second user device can be identified as a source of the user data.

The second user device is tamper-proof such that the user or a third party cannot manipulate the user data. Thus, the user may not be able to increase a number of steps included in the user data or pretend an activity, for example, to generate the activity data in "illicit manner".

The first and/or the second logic may specify a rule and/or an arithmetic operation for aggregating the user data. For example, the first logic provides for adding up sequential records of the user data, such as daily step counts.

By comparing the user data with the aggregated user data, the external server can determine whether an aggregation of the digitally signed data according to the first logic is reconcila-ble with the second logic.

The second logic may be defined by an external entity. For example, the second logic may be defined in connection with a smart contract between the user and the external entity.

The external server can be configured to connect to the first user device via a network path or via the internet to transmit the aggregated user data and the user data.

Moreover, the external server can be operated by a trusted third party such that the external entity cannot access the user data. The external entity can (only) access a result of a verification of the digitally signed and/or the aggregated user data. In some embodiments, the external entity cannot access the aggregated user data as well.

Thus, a privacy of the user can be preserved towards the external entity. Further, the method may create confidence of the external entity in the validity of the digitally signed and/or the aggregated user data.

According to a second aspect, the present disclosure relates to a first user device. The first user device is configured to receive user data from a tamper-proof second user device and aggregate the user data according to a first logic. Further, the first user device is configured to transmit the aggregated user data and the user data to an external server for verifying whether the first logic, by which the aggregated user data and the user data are related to each other, corresponds to a predefined second logic for verifying a validity of the aggregated user data.

According to a third aspect, the present disclosure relates to an external server which is configured to receive user data and aggregated user data from a first user device. The user data is obtained from a tamper-proof second user device. Further, the external server is configured to verify whether the first logic by which the aggregated user data and the user data are related to each other corresponds to a predefined second logic for verifying a validity of the aggregated user data.

The first user device and the external server, for example, can be configured such as described in connection with the aforementioned method.

According to a fourth aspect, the present disclosure relates to a data processing system which comprises an external server and a first user. The first user device is configured to receive user data from a tamper-proof second user device and to determine aggregated user data from the user data. Moreover, the first user device is configured to transmit the aggregated user data and the user data to the external server. The external server is configured to verify whether the first logic by which the aggregated user data and the user data are related to each other corresponds to a predefined second logic for verifying a validity of the aggregated user data.

The aforementioned method, for example, can be executed using the data processing system.

According to a fifth aspect, the present disclosure relates to a computer program comprising instructions which, when executed by at least one processor, causes the processor to perform the aforementioned method.

BRIEF DESCRIPTION OF THE FIGURES

Some examples of apparatuses and/or methods will be described in the following by way of example only, and with reference to the accompanying figures, in which

FIG. 3a illustrates a transmission of the user data and digitally signed encrypted user data;

FIG. 4 shows a block diagram schematically illustrating an example of the method for a privacy preserving verification of user data.

DETAILED DESCRIPTION

Figure 1:
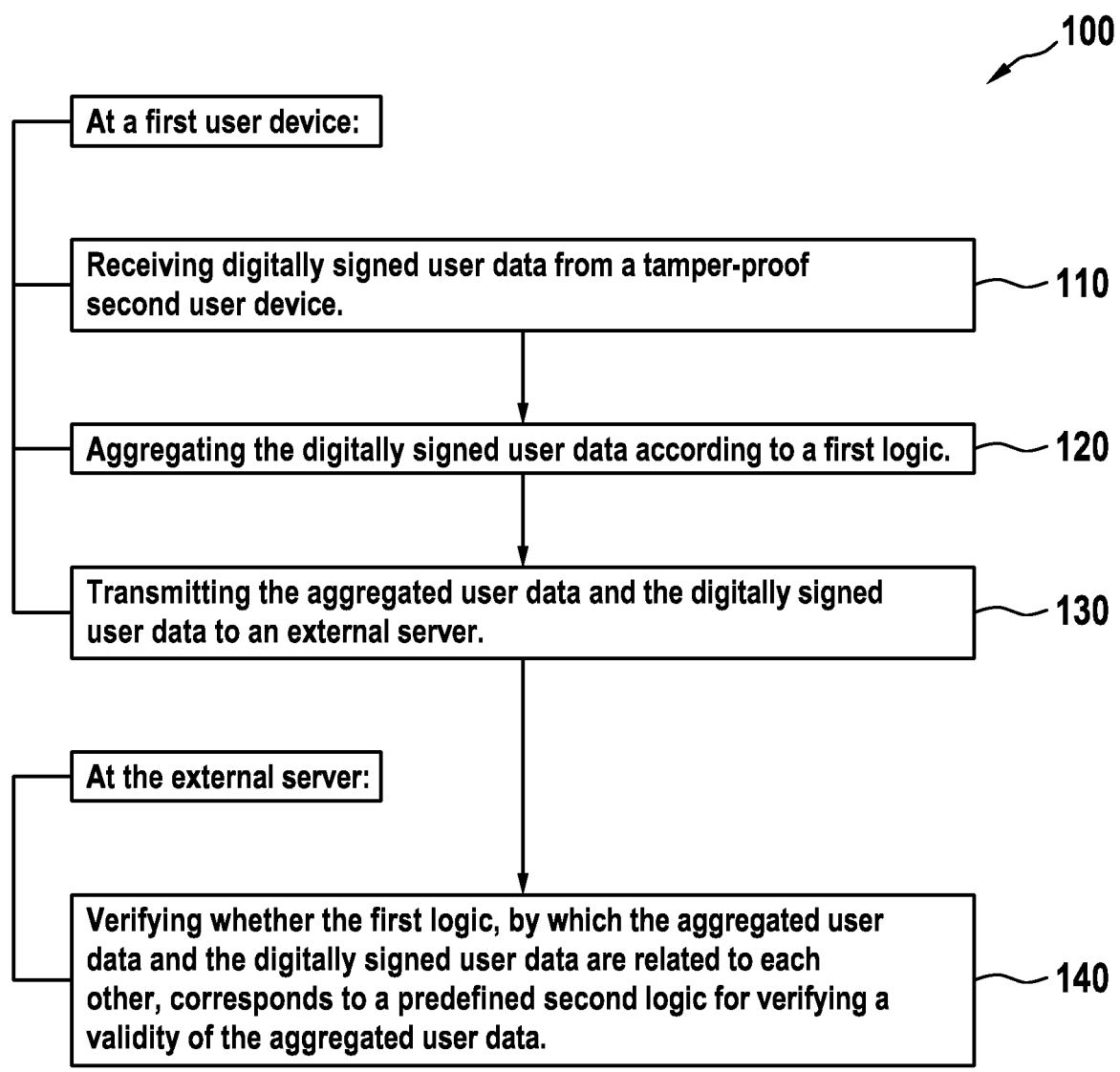
FIG. 1 shows a block diagram schematically illustrating a method for a privacy preserving verification of user data.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Same or like numbers refer to like or similar elements throughout the description of the figures, which may be implemented iden-tically or in modified form when compared to one another while providing for the same or a similar functionality.

It will be understood that when an element is referred to as being "connected" or "coupled" to another element, the elements may be directly connected or coupled via one or more in-tervening elements. If two elements A and B are combined using an "or", this is to be understood to disclose all possible combinations, i.e. only A, only B as well as A and B, if not explicitly or implicitly defined otherwise. An alternative wording for the same combinations is "at least one of A and B" or "A and/or B". The same applies, mutatis mutandis, for combinations of more than two Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

In order to verify a validity of user data, for example in connection with a smart contract, the user may need to reveal the user data to an external entity participating in the smart contract. Since the user data may contain sensitive personal information, a privacy of the user may be violated by revealing the user data to the external entity.

Further, the external entity may have concerns that the user data has been tampered.

Thus, there may be a demand of a concept providing a privacy preserving verification of user data.

FIG. 1 schematically illustrates a method 100 for a privacy preserving verification of user data.

The method comprises, at a first user device, receiving 110 user data from a tamper-proof second user device and aggregating 120 the user data according to a first logic. Further, the method 100 comprises transmitting 130 the aggregated user data and the user data to an external server.

Further, the method 100 provides for verifying whether the first logic, by which the aggregated user data and the user data are related to each other, corresponds to a predefined second logic for verifying a validity of the aggregated user data at the external server.

Figure 2:
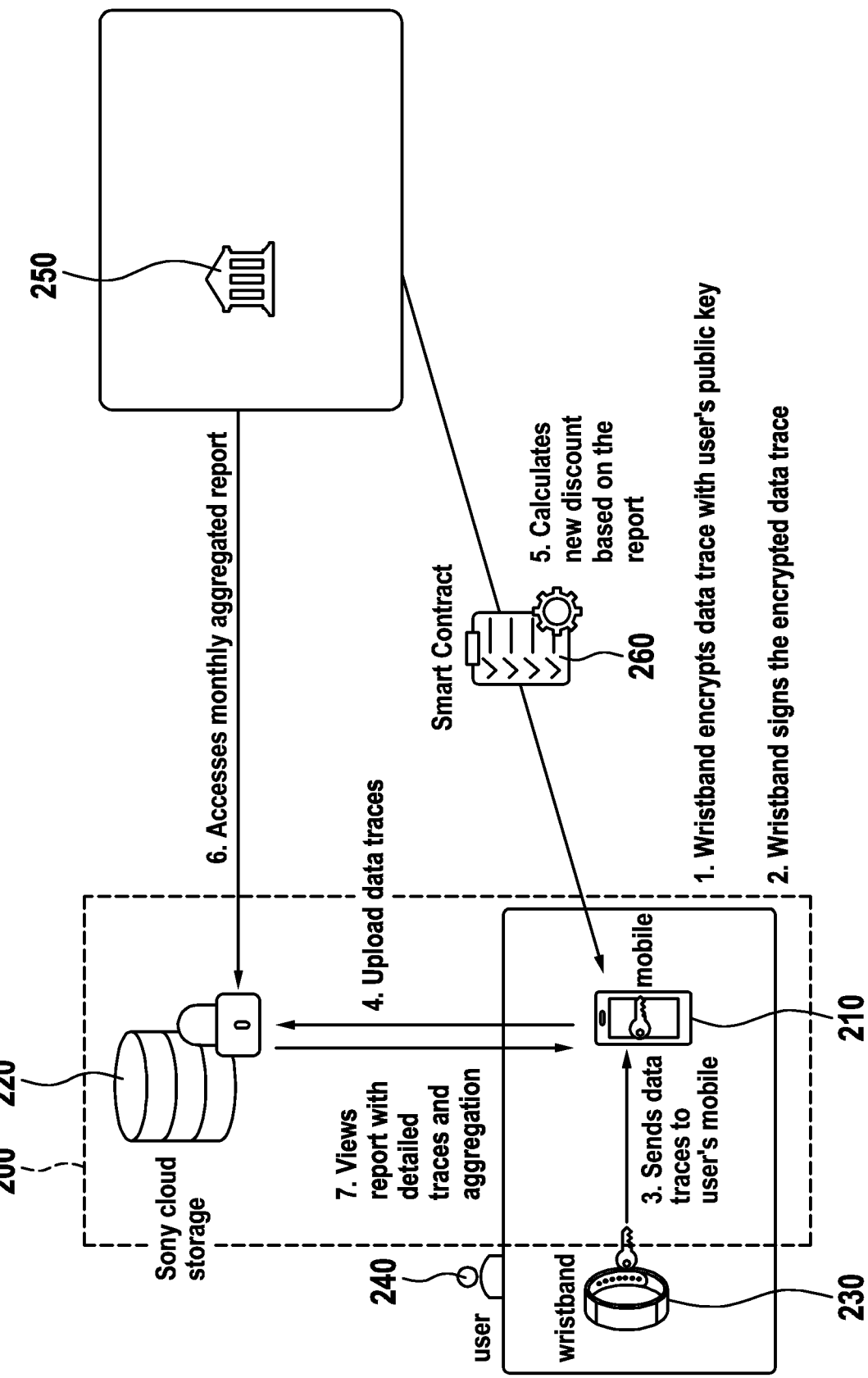
FIG. 2 illustrates a first example of a data sharing system.

As can be seen in FIG. 2, the external server can be implemented as cloud storage 220 of a data processing system 200.

The data processing system 200 further comprises a mobile phone 210 of a user 240 as the first user device.

The mobile phone 210 can communicate with a second user device 230 to transmit the user data. In the shown example, the second user device 230 corresponds to an activity tracker. As can be seen in FIG. 2, the activity tracker 230 is, for example, designed as a wristband.

As illustrated in FIG. 3a, user data 310 can comprise a first set 312-1 and at least one second set 312-2 of the user data 310. The first and the second set 312-1 and 312-1 of the user data 310, for example, each represent a daily record. In some embodiments of the present disclosure, each of the first and the second set 312-1 and 312-2 of the user data 310 may comprise multiple records.

The activity tracker 230 may communicate digitally signed encrypted user data 320 to the mobile phone 210 of the user 240. For this, the activity tracker 230 can encrypt and sign the user data 310. The activity tracker 230, for example, homomorphically encrypts the daily records with a public key of the mobile phone 210.

The user data 310 or the encrypted user data can be signed with a private (signing) key of the activity tracker 230 to obtain the digitally signed encrypted user data 320.

The private (signing key) can be (physically) embedded in a hardware of the activity tracker 230 by its manufacturer. Thus, a signature on the digitally signed encrypted user data 320 can guarantee their authenticity.

Figure 3B:
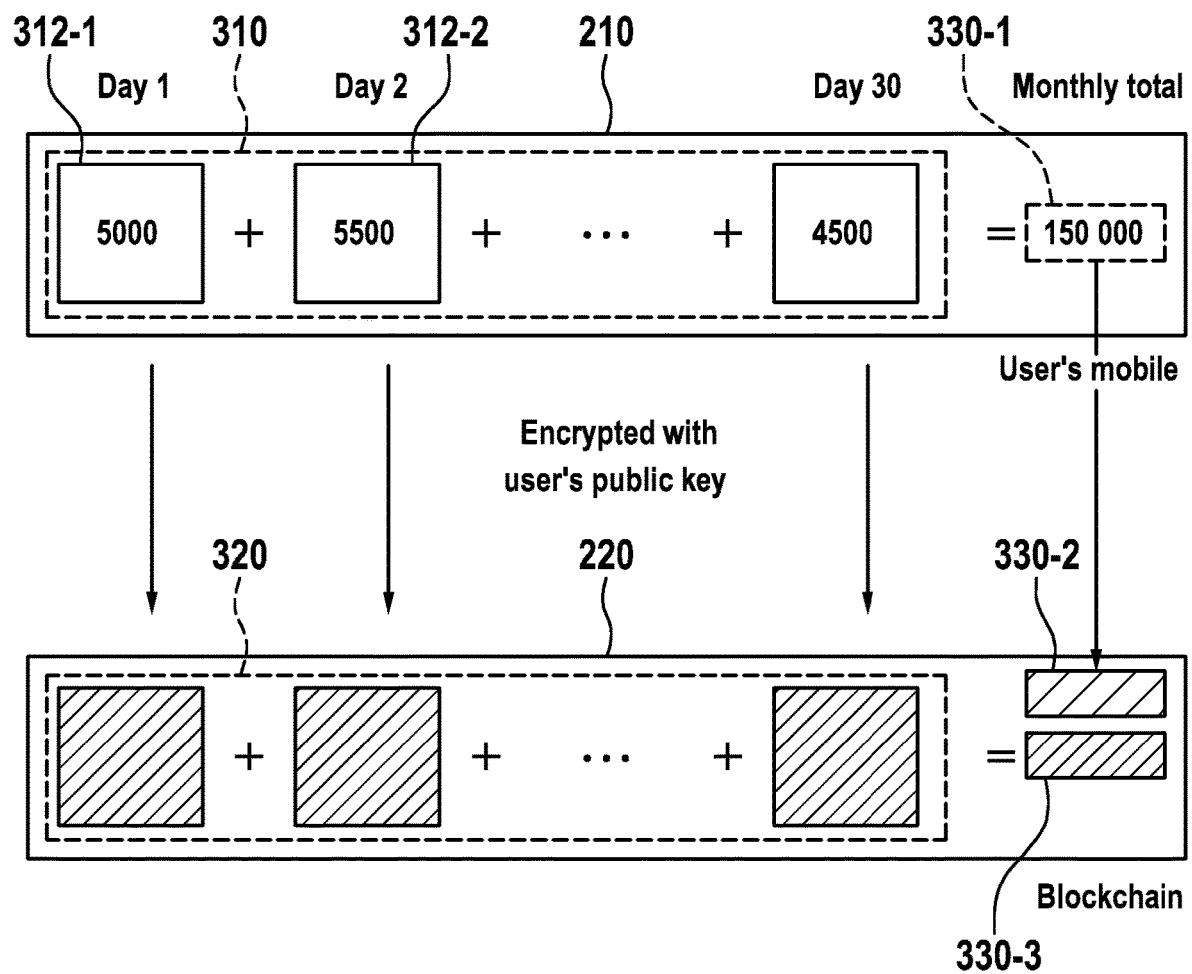
FIG. 3b illustrates a verification of the aggregated user data.

The mobile phone 210 is capable of recovering the user data 310 by decrypting the digitally signed encrypted user data 320 with a private key of the mobile phone 210, as illustrated in FIG. 3b.

Hence, the mobile phone 210 can aggregate the (plaintext) user data 310 according to the first logic for 3 generating (plaintext) aggregated user data 330-1, for a comparison with the second predefined logic, as stated in more detail later.

The predefined second logic, for example, prescribes adding up the first set 312-1 of the user data 310 and at least a second set 312-2 of the user data 310 for generating the aggregated user data 330-1.

Moreover, the first set 312-1 of user data 310 can be indicative of first time period and the second set 312-2 of the user data 310 can be indicative of a second time period.

For example, the first set and the second set 312-1 and 312-2 of the user data 310 are indicative of daily step counts.

As indicated with an arrow in FIG. 2 and FIG. 3b, the mobile phone 210 transmits the digitally signed encrypted user data 320 and the aggregated user data 330-1 to the cloud storage 220.

For a verification, the cloud storage 220 determines first encrypted aggregated user data 330-3 by aggregating the digitally signed encrypted user data 320 received from the mobile phone 210 according to the predefined second logic.

Further, the cloud storage 220 determines second encrypted aggregated user data 330-2 by homomorphically encrypting the aggregated user data 330-1 received from the mobile phone 210.

Consequently, the cloud storage can verify the validity of the aggregated user data 330-1 data by checking the first and the second encrypted aggregated user data 330-3 and 330-2 for correspondence.

Due to a homomorphic encryption of the first and the second encrypted aggregated user data 330-3 and 330-2, those may correspond if they stem from the same user data 310 and if the first logic corresponds to the second logic. Further, the correspondence of the first and the second encrypted aggregated user data 330-3 and 330-2 may indicate a matching signature of the user data 310 with the private key of the activity tracker 230.

This may enable an external entity 250 to obtain certainty about the validity of the aggregated user data 330-1. Simultaneously, the user 240 does not need to reveal single records of the user data 310 to the external entity 250 for the verification of the aggregated user data 330-1. Moreover, the records of the user data 310 are not visible publically at any time.

The external entity 250, for example, is a private person or a company.

Subsequently, the external entity 250 can access the (plaintext) aggregated user data 330-1 and a result of the verification to check the validity of the aggregated user data 330-1.

This concept described in connection with the aforementioned embodiments may further enable a non-interactive, but privacy preserving way for the verification of the aggregated user data 330-1.

In order to prevent from precomputation attacks affecting the digitally signed encrypted user data 320, an encryption of the user data 310 can provide for adding some random noise to records of the user data 310. The random noise can be multiple magnitudes lower than val-ues of the records 312-1 and 312-2 of the user data 310 such that the random noise has no influence on the first and the second encrypted aggregated user data 330-3 and 330-2 determined from the digitally signed encrypted user data 320.

Thus, the digitally signed encrypted user data 320 cannot be precomputed, whereas the aggregated user data 310 may not be influenced by the random noise.

The aforementioned method can be comprised of a smart contract 260 between the user 240 and the external entity 250.

Depending on the validity of the aggregated user data 330-1, the method 100 may further comprise triggering an interaction between the user 240 and the external entity 250 in accordance with the smart contract 260, as shown in FIG. 2.

The interaction, for example, implies a refund and/or a discount for the user 240 on products of the external entity 250.

For reasons of transparency and security, the cloud storage 220 which executes the verification and/or stores/manages the smart contract 260, can be implemented as a blockchain (system).

Figure 5:
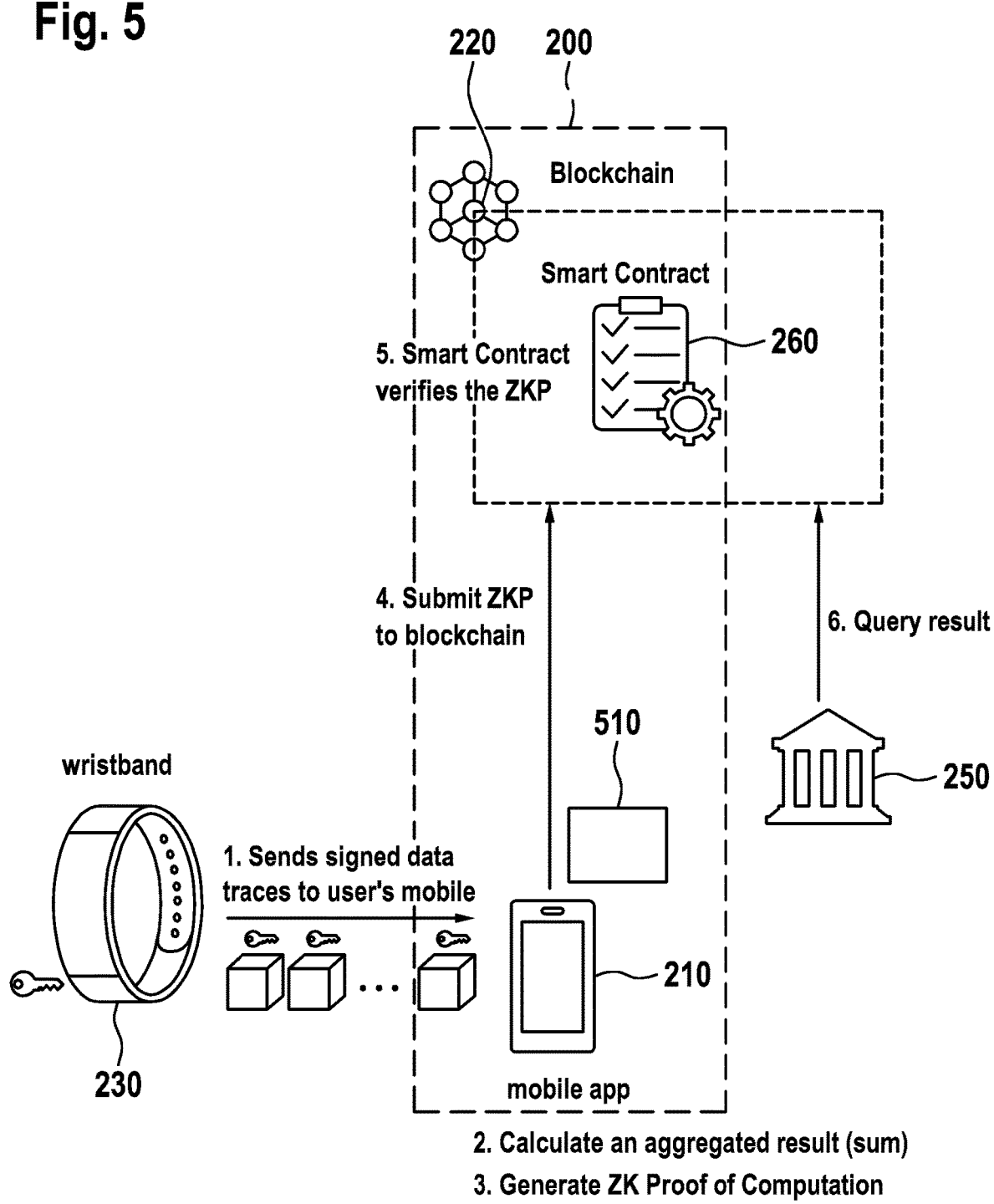
FIG. 5 illustrates a second example of the data sharing system.

As can be seen in FIG. 4 and FIG. 5, the method 100 can further comprise providing the user data 310 and the aggregated user data 330-1 to a zero-knowledge proof (ZKP) proving function (as input) for generating a cryptographic proof 510 which denotes whether the aggregated user 330-1 data is calculated based on the user data 310 according to the second logic without containing or revealing the user data 310 and the aggregated user data 330-1. This, for example, is executed by the mobile phone 210 running a (proper) proving program or a "ZKP prover" using the above proving function for generating the cryptographic proof 510.

In other words, the user, for example, runs the "ZKP prover" program which takes the user data 310 and the aggregated user data 330-1 as input to generate the cryptographic proof 510. The cryptographic proof 510, for example, is a zero-knowledge succinct non-interactive argument of knowledge (zk-SNARK) which does not contain the user data 310 and/or the aggregated user data 330-1 explicitly.

Further, the mobile phone 210 can transmit the aggregated user data 330-1 and the cryptographic proof 510 to the external entity. Thereby, the mobile phone 210, for example, does not transmit the user data 310 itself.

The cryptographic proof 510 allows to verify that the aggregated user data 330-1 was generated based on the second logic which, for example, provides for adding up the user data 310.

Thus, the cryptographic proof 510 can be understood as a proof of a/an (agreed) computa-tion.

Moreover, the method 100 can comprise obtaining 160 a binary value from the cryptographic proof 510 using a ZKP verifying function related to the ZKP proving function. In this context, the ZKP verifying function can be understood as being "related to the ZKP proving function" in such a way that the ZKP verifying function is configured or dedicated to verify cryptographic proofs generated by the ZKP proving function.

The binary value indicates whether the first logic denoting the aggregation of the user data 310 corresponds to the predefined second logic. Thus, the binary value denotes the validity of the aggregated user data 330-1.

The external entity 250, for example, runs a "ZKP verifier" program which takes the cryptographic proof 510 and the aggregated user data 330-1 as input for verifying whether the aggregated user data 330-1 results from an aggregation of the user data 310 according to the predefined second logic.

In cryptography, a zero knowledge proof can be used by a first party (prover) to prove to another party (verifier) that they know a value x, without conveying any information apart from the fact that they know the value x.

Depending on which of various concepts (based on e.g. a discrete log of the value, a Hamil-tonian cycle for a graph, (non-) interactive zero knowledge proof) is used for generating the cryptographic proof 510, various mathematical operations can be applied to the user data 310 and the aggregated user data 330-1 which can be understood as input of the ZKP proving function.

As can be seen in FIG. 5, the mobile phone 210 can communicate the cryptographic proof 510 to a blockchain 220.

The blockchain 220, for example, is configured to obtain the binary value from the cryptographic proof 510 and the aggregated user data 330-1 using the ZKP verifying function. The binary value, for example, is a Boolean value.

Depending on its state (e.g. "True" or "False"), the Boolean value indicates whether the first logic corresponds to the predefined second logic ("True") or not ("False"). Thus, the Boolean value may implicitly indicate the validity of the aggregated user data.

Subsequently, the mobile phone 210 can transmit the aggregated user data 330-1 to the external entity 250, either directly or via the blockchain 220, for example, in order to trigger an interaction defined by the smart contract 260.

As well as aforementioned embodiments of the method 100, this concept incorporating the cryptographic proof 510 may enable a non-interactive, privacy preserving verification of the aggregated user data 330-1 since an amount of information exposed to the external server can be reduced compared to known concepts.

The skilled person having benefit from the present disclosure will appreciate that the aforementioned concept using the cryptographic proof 510 for verifying the validity of the aggregated user data 330-1 can be adapted to various use cases stated above in the present disclosure.

The aspects and features mentioned and described together with one or more of the previ-ously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F)PGAs), programmed to perform the acts of the above-described methods.

The description and drawings merely illustrate the principles of the disclosure. Furthermore, all examples recited herein are principally intended expressly to be only for illustrative pur-poses to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a signal", "means for generating a signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

The following examples pertain to further embodiments:

(1) A method, comprising:
at a first user device:
receiving user data from a tamper-proof second user device;
aggregating the user data according to a first logic;
transmitting the aggregated user data and the user data to an external server;
at the external server:
verifying whether the first logic, by which the aggregated user data and the user data are related to each other, corresponds to a predefined second logic for verifying a validity of the aggregated user data.

(2) The method of (1), wherein the method further comprises:
generating encrypted user data by homomorphically encrypting the user data, generating digitally signed encrypted user data by signing the encrypted user data, wherein transmitting the user data comprises transmitting the digitally signed encrypted user data; and
wherein verifying whether the first logic corresponds to the predefined second logic comprises:
determining first encrypted aggregated user data by aggregating the digitally signed encrypted user data received from the first user device according to the predefined second logic;
determining second encrypted aggregated user data by homomorphically encrypting the aggregated user data received from the first user device; and
verifying the validity of the aggregated user data by checking the first and the second encrypted aggregated user data for correspondence.

(3) The method of (1), wherein the method comprises providing the user data and the aggregated user data to a zero-knowledge proof protocol as a function based on metadata stored on the first user device for transmitting a cryptographic proof that the aggregated user data is calculated based on the user data, to the external server; and
obtaining a binary value from the zero-knowledge proof protocol using the cryptographic proof and the metadata stored on the external server, wherein the binary value indicates whether the first logic corresponds to the predefined second logic for verifying the validity of the aggregated user data.

(4) The method of any of (1) to (3), wherein the method further comprises storing the aggregated user data in a blockchain implemented on the external server.

(5) The method of any one of (1) to (4), wherein the method is comprised of a smart contract between a user and an external entity and, wherein the method further comprises
triggering an interaction between the user and the external entity in accordance with the smart contract depending on the validity of the aggregated user data.

(6) The method of any one of (1) to (5), wherein the predefined second logic prescribes adding up a first set of the user data and at least a second set of the user data.

(7) The method of any one of (1) to (6), wherein the user data comprises a first set of user data indicative of a first time period and at least a second set of user data indicative of a second time period.

(8) The method of any one of (1) to (7), wherein the user data refers to a step count.

(9) A first user device configured to:
receive user data from a tamper-proof second user device;
aggregate the user data according to a first logic;
transmit the aggregated user data and the user data to an external server for verifying whether the first logic, by which the aggregated user data and the user data are related to each other, corresponds to a predefined second logic for verifying a validity of the aggregated user data.

(10) External server configured to:
receive user data and aggregated user data from a first user device, wherein the user data is obtained from a tamper-proof second user device; and
verify whether the first logic by which the aggregated user data and the user data are related to each other corresponds to a predefined second logic for verifying a validity of the aggregated user data.

(11) Data processing system comprising:
an external server; and
a first user device configured to:
receive user data from a tamper-proof second user device;
determine aggregated user data from the user data; and
transmit the aggregated user data and the user data to the external server, wherein the external server is configured to verify whether the first logic by which the aggregated user data and the user data are related to each other corresponds to a predefined second logic for verifying a validity of the aggregated user data.

(12) A computer program comprising instructions which, when executed by at least one processor, causes the processor to perform the method of (1).

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

The invention claimed is:

1. A method, comprising at a first user device:
receiving user data from a tamper-proof second user device;
aggregating the user data according to a first logic to generate plaintext aggregated user data;
transmitting the aggregated user data and the user data to an external server;
at the external server:
determining first aggregated encrypted data by applying a predefined second logic to the user data;
determining second aggregated encrypted data by encrypting the plaintext aggregated user data received from the first user device;
verifying whether the first logic, by which the aggregated user data and the user data are related to each other, corresponds to the predefined second logic for verifying a validity of the aggregated user data by comparing the first aggregated encrypted data and the second aggregated encrypted data; and
providing an external entity access to a verification result indicating the validity of the aggregated user data while preventing the external entity from accessing the user data and the aggregated user data.

2. The method of claim 1, wherein the method further comprises:
generating encrypted user data by homomorphically encrypting the user data,
generating digitally signed encrypted user data by signing the encrypted user data,
wherein transmitting the user data comprises transmitting the digitally signed encrypted user data.

3. The method of claim 1, wherein the method comprises
providing the user data and the aggregated user data to a zero-knowledge proof (ZKP) proving function for generating a cryptographic proof indicating whether the aggregated user data is calculated based on the user data according to the second logic,
wherein transmitting the aggregated user data and the user data comprises transmitting the cryptographic proof to the external entity; and
obtaining a binary value from the cryptographic proof using a ZKP verifying function related to the ZKP proving function, wherein the binary value indicates whether the first logic corresponds to the predefined second logic for verifying the validity of the aggregated user data.

4. The method of claim 1, wherein the method further comprises storing the aggregated user data in a blockchain implemented on the external server.

5. The method of claim 1, wherein the method is comprised of a smart contract between a user and an external entity and, wherein the method further comprises triggering an interaction between the user and the external entity in accordance with the smart contract depending on the validity of the aggregated user data.

6. The method of claim 1, wherein the predefined second logic prescribes adding up a first set of the user data and at least a second set of the user data.

7. The method of claim 1, wherein the user data comprises a first set of user data indicative of a first time period and at least a second set of user data indicative of a second time period.

8. The method of claim 1, wherein the user data refers to a step count.

9. A first user device, comprising:
processing circuitry configured to
receive user data from a tamper-proof second user device;
aggregate the user data according to a first logic to generate plaintext aggregated user data;
transmit the aggregated user data and the user data to an external server for verifying whether the first logic, by which the aggregated user data and the user data are related to each other, corresponds to a predefined second logic for verifying a validity of the aggregated user data by comparing first aggregated encrypted data determined by applying the predefined second logic to the user data and the second aggregated encrypted data determined by encrypting the plaintext aggregated user data; and
receive a verification result from the external server, wherein the external server provides an external entity access to the verification result indicating the validity of the aggregated user data while preventing the external entity from accessing the user data and the aggregated user data.

10. An external server, comprising:
processing circuitry configured to
receive user data and aggregated user data from a first user device, wherein the aggregated use data is aggregated according to a first logic to generate plaintext aggregated user data, wherein the user data is obtained from a tamper-proof second user device;
determine first aggregated encrypted data by applying the predefined second logic to the user data;
determine second aggregated encrypted data by encrypting the plaintext aggregated user data received from the first user device;
verify whether the first logic by which the aggregated user data and the user data are related to each other corresponds to the predefined second logic for verifying a validity of the aggregated user data by comparing the first aggregated encrypted data and the second aggregated encrypted data; and
provide an external entity access to a verification result indicating the validity of the aggregated user data while preventing the external entity from accessing the user data and the aggregated user data.

11. Data processing system comprising:
an external server; and
a first user device configured to:
receive user data from a tamper-proof second user device;
determine aggregated user data from the user data according to a first logic to generate plaintext aggregated user data; and
transmit the aggregated user data and the user data to the external server, wherein the external server is configured to
determine first aggregated encrypted data by applying a predefined second logic to the user data;
determine second aggregated encrypted data by encrypting the plaintext aggregated user data received from the first user device;
verify whether the first logic by which the aggregated user data and the user data are related to each other corresponds to the predefined second logic for verifying a validity of the aggregated user data by comparing the first aggregated encrypted data and the second aggregated encrypted data; and provide an external entity access to a verification result indicating the validity of the aggregated user data while preventing the external entity from accessing the user data and the aggregated user data.

12. A non-transitory computer-readable storage medium storing computer-readable instructions thereon which, when executed by at least one processor, causes the processor to perform the method of claim 1.

\* \* \* \* \*